United States Patent [19]

Clendinning et al.

[11] 3,932,319

[45] Jan. 13, 1976

[54] BLENDS OF A BIODEGRADABLE THERMOPLASTIC DIALKANOYL POLYMER, A NATURALLY OCCURRING BIODEGRADABLE PRODUCT, A PLASTIC ADDITIVE AND A FILLER

[75] Inventors: Robert A. Clendinning, New Providence; James E. Potts, Millington; Walter D. Niegisch, Watchung, all of N.J.

[73] Assignee: Union Carbide Corporation, New York, N.Y.

[22] Filed: July 15, 1974

[21] Appl. No.: 488,494

Related U.S. Application Data

[62] Division of Ser. No. 275,973, July 28, 1972, Pat. No. 3,850,862.

[52] U.S. Cl. ................. 260/7.5; 47/9; 220/1 R; 220/DIG. 30; 260/9; 260/40 R; 260/78.4 E; 260/78.4 R; 260/862; 260/DIG. 43
[51] Int. Cl.² ................................... C08L 67/02
[58] Field of Search ......... 260/7.5, 9, 40 R, 78.4 R, 260/78.4 E, 862; 47/9

[56] References Cited
UNITED STATES PATENTS

| | | | |
|---|---|---|---|
| 2,071,250 | 2/1937 | Carothers | 260/78.4 |
| 2,757,160 | 7/1956 | Anderson | 260/862 |
| 3,314,205 | 4/1967 | Davis, Jr. | 260/9 |
| 3,361,690 | 1/1968 | Gregory et al. | 260/9 |
| 3,481,257 | 12/1969 | Shimp et al. | 260/9 |
| 3,636,956 | 1/1972 | Schneider | 260/78.3 |
| 3,647,111 | 3/1972 | Stager et al. | 220/83 |
| 3,746,670 | 7/1973 | McGuire | 260/7.5 |

OTHER PUBLICATIONS

Polymer Preprints, Vol. 13, No. 2, pp. 629–634, Potts et al., 7/15/72.
Chem. Tech., July 1971, pp. 409–415 Rodriquez.
Applied Microbiology, Vol. 16, No. 6, pp. 900–905, Darby et al.

*Primary Examiner*—Eugene C. Rzucidlo
*Attorney, Agent, or Firm*—James J. O'Connell

[57] ABSTRACT

Novel blends comprising biodegradable thermoplastic dialkanoyl polymer, e.g., poly(alkylene adipate), and additional material such as naturally occurring biodegradable product, e.g., tree bark; and to the novel shaped articles therefrom. In one aspect, the invention is directed to novel shaped containers fabricated from material comprising biodegradable thermoplastic dialkanoyl polymer, said containers possessing a germination medium, and optionally, a seed or seedling in such medium.

30 Claims, No Drawings

BLENDS OF A BIODEGRADABLE THERMOPLASTIC DIALKANOYL POLYMER, A NATURALLY OCCURRING BIODEGRADABLE PRODUCT, A PLASTIC ADDITIVE AND A FILLER

This is a division of application Ser. No. 275,973 filed July 28, 1972, now U.S. Pat. No. 3,850,862.

This invention relates to novel blends comprising biodegradable thermoplastic dialkanoyl polymer such as poly(ethylene adipate) and other components such as naturally occurring biodegradable product, e.g., tree bark; to the novel shaped articles fabricated therefrom as exemplified by mulch films, transplanter containers, disposable containers, shipping crates and boxes, and the like; and to transplanter containers which possess a seed-germination medium, and optionally, a seed or seedling in such medium.

Agricultural mulches are used to cover the soil about crops or other plantings in order to prevent or retard weed growth and to increase soil water retention and temperature. For many years, various naturally occurring materials have been used for this purpose such as peat moss, wood chips, chopped bark, sawdust, etc. However, repeated rainfalls tend to wash away such natural mulches leaving void and barren areas in the field. More recently, polyethylene film, both in its transparent state and its opaque state, has been found to be a useful mulch. When its presence on the ground is no longer desired, the film is physically removed from the fields. The necessity of such removal increases costs and complicates post harvest field preparation. Currently, the film is collected and burned. Obviously, it would be more desirable if the use of synthetic mulches more closely conformed to the practice with natural mulches. These natural mulches are not removed from the ground, but rather are turned back into the soil upon plowing at the start of the next growing season. Such factors undoubtedly led to the recent development of photodegradable or light degradable polyethylene film mulches. Various additives and ultraviolet light absorbers are compounded into the polyethylene thereby rendering this polymer photodegradable. The cost disadvantages incurred by adding and compounding such ingredients in polyethylene are obvious.

In the seed and nursery industries, it is the practice of he horticulturist to plant seeds or seedlings in soil or conditioned material which is contained in relatively small containers, such as metal cans or clay pots, so that initial growth may be carefully controlled under greenhouse or other desirable conditions. During such growth, the root system of the plant develops and becomes established within the soil or other material in the container. The use of metal, clay or other similar types of containers is generally satisfactory during the initial growth period. A major drawback of such containers is that the plant must be entirely removed from the container when it is to be transplanted to the field or to a larger container. Since the root system has developed within the soil or material in which growth was started, the roots are firmly embedded and intertwined with such soil and removal from the container of the plant and the soil in which the roots are established disturbs the root system anad results in damage thereto. It would be advantageous, therefore, if such containers were fabricated from materials comprising biodegradable substances in which the container possessed the capability of maintaining its shape during the initial growth period of a plant and, after transplanting the container and its contents to the field, it possessed the capability of biodegrading and disintegrating.

In the regeneration of forests it is the practice of the silviculturist to employ, for the most part, bare-root planting methods. Though it is estimated that well over one billion bare-root tree seedlings are planted annually in North America, the bare-root planting method is fraught with disadvantages. A formidable obstacle to the silviculturist is the rapidity of physical deterioration of the bare-root stock. Reforestation is also beset with labor problems, antiquated tools, and dated concepts of planting. The silviculturist has very recently turned to experimenting with container planting methods. In this regard, new shapes and types of containers and accessory equipment for growing and planting seedlings have been devised. One method involves the mechanical metering of containerized seedlings into the terrain. The equipment utilized is a "planting gun" in which the container, in the shape of a "bullet," is placed into the planting gun, passed through the gun muzzle, and then mechanically inserted into the ground. The bullet can be fabricated from material such as polystyrene and is quite rigid in construction. To permit root egress of the seedling from such bullet to the surrounding soil after planting, the walls of the bullet can be weakened by strategically located grooves, splits, and/or holes. Unfortunately, there are drawbacks to the transplanter container method briefly described above. The plastic container or bullet is not biodegradable, that is, it is not consumed or substantially consumed by the action of microorganisms such as fungi or bacteria. Not only does this non-biodegradability factor represent an ecological problem, but also interference of the root system by the container wall results in damage and stunted growth of the seedling.

The literal inundation of our lands in recent years with plastic and plastic-like packaging material and shipping containers in the form of discarded film, boxes, crates, wrappings, etc., has received wide attention during the last decade. One approach towards a partial solution to this litter and disposal problem has been the incorporation of various additives into plastics to make them photodegradable. This approach, though of limited applicability, has merit and will probably gain, in the coming years, support from citizen-minded and nature-loving groups. Other approaches and alternatives, obviously, are being investigated.

Accordingly, it is an object of this invention to provide novel biodegradable blends comprising biodegradable thermoplastic dialkanoyl polymer and other components such as naturally occurring biodegradable product. It is also an object of the invention to provide novel blends from materials comprising biodegradable substances, said blends having the capability of being fabricated into articles of commerce, e.g., boxes, crates, packing material, and the like. Another object of the invention is to provide novel shaped biodegradable articles in the form of film, disposable containers, transplanter containers, shipping containers, storage containers, packaging material, toys, and the like. A further object is to provide an improved transplanter container fabricated from materials comprising biodegradable substances, said container having the capability of maintaining its shape during the initial growth period of a plant whereby the entire container and its contents can be transplanted by hand or mechanical means, to the field or to a larger container without disturbing or damaging the root system. A still further object is to provide a novel biodegradable transplanter container which has sufficient strength to contain the soil in which the seed or seedling is planted, which has the capability of disintegrating when planted in the field, and which upon disintegration possesses the quality of acting as a soil conditioner whereby plant growth is encouraged and improved. A particular object is to provide an improved transplanter container constructed of materials which has the property of holding its shape in a moist and/or humid environment. A yet further object of the invention is to provide a novel agricultural mulch from material comprising biodegradable thermoplastic oxyalkanoyl polymer. Another object of the invention is to provide improved methods utilizing biodegradable mulches and transplanter containers. Still another object of the invention is to provide a novel article of manufacture comprising a biodegradable thermoplastic container, a germination medium, and a seed or seedling therein, said container having the capability of maintaining its shape during the initial growth period of a plant whereby the entire container and its contents can be transplanted, by hand or mechanical means, to the field or to a larger container without disturbing or damaging the root system. At least one of the aforesaid objects and other objects will become apparent to those skilled in the art in the light of the specification.

A broad aspect of the invention is directed to novel blends or mixtures comprising biodegradable thermoplastic dialkanoyl polymer and other components such as naturally occurring biodegradable product. The naturally occurring biodegradable products which are suitable in the practice of preferred embodiments of the invention are derived from or are a part of plant or animal species, especially those products which have not been chemically modified by man. Cellulosic esters and cellulosic ethers are substances which have been so modified. Strictly speaking, biodegradable materials are those which, because of their chemical structure are susceptible to being assimilated by microorganisms such as molds, fungi, and bacteria, when buried in the ground or otherwise contacted with the organisms under conditions conductive to their growth. The term "biodegradable" is often used indiscriminately to refer to various types of environmental degradation, including photodegradation. Though a polymeric material may be degraded by sunlight and oxygen this does not necessarily mean that such material will also be assimilated by microorganisms. The term "biodegradable," as used herein, is reserved for that type of degradability which is brought about by living organisms, usually microorganisms.

The naturally occurring biodegradable products which are suitable in the practice of the invention include, by way of illustrations, sugar cane residue, sugar beet residue, peat moss, sawdust, hemp, sisal, linen, corn starch, cotton, rice hulls, wheat bran, soybean meal, potato starch, corn syrup, rice flour, gelatin, barley flour, rye flour, granulated sugar, wheat flour, wood chips, brewers yeast, vegetable gum, egg albumin, carboard, disintegrated or shredded tree bark especially Douglas Fir bark and Pine bark, cotton seed hulls, manure, disintegrated paper stock, shredded wood, hulled and coarsely ground as well as finely ground grain, and the like.

The thermoplastic dialkanoyl polymers which are suitable in the practice of the invention possess a reduced viscosity value of at least about 0.1 and upwards to about 10, and higher. In various desirable embodiments thermoplastic dialkanoyl polymers which have a wide span of usefulness are those which possess a reduced viscosity value in the range of from about 0.2 to about 5. These polymers are further characterized in that they contain at least about 10 weight percent recurring linear dialkanoyl-containing unit of the formula:

wherein R represents a divalent aliphatic hydrocarbon radical desirably a $C_1$-$C_{12}$alkylene and $C_2$-$C_{12}$alkylidene, e.g., methylene, ethylene, propylene, tetramethylene, heptamethylene, octamethylene, decamethylene, ethylidene, propylidene, octylidene, etc.; and wherein R' represents a divalent aliphatic hydrocarbon radical as described above or a divalent aliphatic oxahydrocarbon radical desirably of the formula -$C_2$-$C_{12}$alkylene(oxy$C_2$-$C_{12}$alkylene)$_x$.

The aforesaid recurring linear unit is interconnected through the oxy group (—O—) of one unit with a carbonyl group $$\left( \begin{matrix} O \\ \| \\ -C- \end{matrix} \right)$$

of a second unit. In addition to the recurring linear unit above, the thermoplastic dialkanoyl polymer may comprise other moieties or groups therein especially those which intersperse or terminate the polymeric chain thereof as illustrated by the $$\left( -\underset{R_1}{\underset{|}{N}}-R-\underset{R_1}{\underset{|}{N}}- \right)_x$$

group; the urethane group, $$-NH\overset{O}{\overset{\|}{C}}O-;$$

the $$\left( -O-\underset{R_1}{\underset{|}{CH}}-\underset{R_1}{\underset{|}{CH}}- \right)$$

group; the $$-NH\overset{O}{\overset{\|}{C}}HN-$$

group; the biuret group, $$-NH\overset{O}{\overset{\|}{C}}\underset{\underset{H}{|}}{N}\overset{O}{\overset{\|}{C}}NH-;$$

the divalent mono- and polyaromatic rings including fused and bridged rings; lower alkyl substituted oxyalkanoyl groups; catalyst residue; the carbonate group,

and others. In the above illustrated groups, $R_1$ desirably is hydrogen or methyl; x represents an integer which has a value of at least one, e.g., from 1 to 4; and R has the aforesaid meaning.

As previously noted, the thermoplastic dialkanoyl polymers which are suitable in the practice of the invention are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other common organic solvent for the polymer may be used) at 30°C.

The thermoplastic dialkanoyl polymers can be prepared by known methods. A general procedure for the preparation of poly(alkylene alkanedioate) glycols (or dicarboxy compounds) involves well-documented esterification techniques using predetermined amounts of an aliphatic diol and an alkanedioic acid. A molar excess of the diol results in dihydroxyl-terminated polymers whereas the use of a molar excess of the dicarboxylic acid gives dicarboxyl-terminated polymers. In general, the alkylene alkanedioate polymers are suitably obtained under reaction conditions of the order of 250°C., and higher, using low pressures, e.g., less than one mm. of Hg. Water of condensation is removed from the reaction zone by conventional equipment suitably for such purposes. Illustrative of the aliphatic glycols which can be employed are ethylene glycol, diethylene glycol, propylene glycol, dipropylene glycol, 1,4-butanediol, 1,3-butylene glycol, 1,5-pentanediol, 1,6-hexanediol, 1,8-octanediol, 1,4-cyclohexane-diol, 1,12-dodecanediol, and the like. Desirably, the aliphatic glycol contains from 2 to 8 carbon atoms. Illustrative alkanedioic acid reactants include malonic acid, succinic acid, glutaric acid, adipic acid, pimelic acid, suberic acid, azelaic acid, sebacic acid, dodecanedioic acid, and the like. Desirably, the alkanedioic acid contains from 2 to 12 carbon atoms. Mixtures of the aforesaid aliphatic glycols and/or alkanedioic acids can be employed. In addition, the reaction mixture can comprise small amounts of hydroxyalkanoic acid, vicinal-epoxy compounds, cyclic ethers, cyclic carbonates, etc., e.g., 6-hydroxycaproic acid, ethylene oxide, tetrahydrofuran, tetramethylene carbonate, and the like, as well as the glycol and diacid reactants. Higher molecular weight themoplastic alkylene alkanedioate polymers can be prepared by following the teachings in the prior art, e.g., note U.S. Pat. Nos. 2,423,823 and 2,071,250. The polyesterification reaction, as typified above, is effected under extremely low pressure, e.g., less than about $10^{-3}$ mm. of Hg using equimolor quantities of diol and diacid.

The alkylene alkanedioate polymers which have number average molecular weights of, for example, less than about 25,000 can be characterized by hydroxyl end-groups or carboxyl end-groups. If desired, these polymers can be reacted with a diisocyanate, e.g., 1,6-hexamethylene diisocyanate, 2,4- and/or 2,6-tolylene diisocyanate, bis(4-isocyanatophenyl)methane, bis(4-isocyanatocylohexyl)methane, etc., to extend the polymeric chain thereof, or such hydroxyl-terminated polymers or carboxyl-terminated polymers as well as their polyurethane extension products can be reacted with so-called "chain stoppers" such as a monocarboxylic acid or anhydride, or a monohydric compound such as an alkanol.

Illustrative of other components which can be admixed or combined with the thermoplastic dialkanoyl polymers to form novel blends which have a wide variety of usefulness include plastic additives such as the normally-solid condensation and addition polymers which are produced during the polymerization process without the evolution of low-molecular weight by-products as well as those which are produced during the polymerization process with the evolution of low molecular weight by-products, e.g., water, alcohol, hydrogen chloride, etc., as illustrated by the polyimides, the polyureas, the polyurethanes, the polyureides, the polyanhydrides, the polyethers, the polyalkenes, the polylactams, the polycarbonates, the nitrile rubber gum stocks, the polybutadiene rubber gumstocks, the styrene/butadiene rubber gumstocks, the phenolic resins, the epoxy resins, the melamine resins, the aminoplasts, the alkenes, and the like. It should be understood that the term "polymer," as used herein, is employed in its generic sense to include homopolymers and copolymers.

Typical polymers useful as plastic additives include the poly(hydroxy ether)polymers which are formed by the polymerization of aliphatic and aromatic polyhydroxy compounds, e.g., alcohols and phenols, with an epihalohydrin. Another class of polymers is the thermoplastic polycarbonates which are derived from dihydroxy compounds or phenols and phosgene. Another class of polymers is the polyamides, such as nylon 6, e.g., polycaprolactam; nylon 6/6, e.g., hexaamethylenediamine-adipic acid or anhydride polycondensate; nylon 6/10, e.g., hexamethylene diaminesebacic acid or anhydride polycondensate; nylon 11, e.g., 11-aminoundecanoic acid polycondensate; and the like. Yet another class is the normally-solid polyoxyalkylene polymers, both unsubstituted and halogenated. The lowest homologous type of this class is the polyoxymethylene polymers, otherwise called acetal resins. In addition, the normally-solid polyoxyethylene, polyoxypropylene, and polyoxybutylene polymers and copolymeric forms such as the poly(oxyethyleneoxypropylene) copolymers, the poly(oxymethyleneoxyethylene) copolymers, and the poly(oxymethyleneoxypropylene) copolymers which have a block or random distribution can be employed as an additive thermoplastic component. Illustrative of the thermoplastic polyurethanes include those which are formed from the toluene diisocyanates (TDI) or diphenylmethane 4,4-diisocyanate (MDI) and a wide range of polyols such as polyoxyethylene glycol, polyoxypropylene glycol, polyoxyethyleneoxypropylene glycols, etc. Polyureas which are suitable include thermoplastic solids having recurring units of the formula: $-[NHR''NHCONHR''NHCO]-$ wherein $R''$ is alkylene or arylene having 2 to 12 carbon atoms. Illustrative of the normally-solid addition polymers include those prepared via the vinyl polymerization of olefinically unsaturated monomers, e.g., monomers having the group >C=C<, such as ethylene, propylene, the butylenes, styrene, vinyl acetate, fumaric acid, ethyl acrylate, mixtures thereof, and the like. The polymers include, for example, the various normally-solid alkene homopolymers and copolymers such as the high and low density polyethylenes, the polypropylenes, and polybutylenes, the polystyrenes, and the like.

Still other components which can be admixed or combined with the biodegradable thermoplastic dialkanoyl polymer include fibrous and nonfibrous fillers, kaolin, bentonite, iron oxide, clay, carbon black, lamp black, silica, titanium dioxide, asbestos, vermiculite, metallic powders, calcium carbonate, calcium sulfate, powdered glass, mica, and the like. The filler, if employed, is desirably in particulate form or of small particle size. Particulate polymers are desirably kept in particulate form during processing and fabricating by remaining below the melting point of the particulate polymer or by crosslinking the particulate polymer either chemically or by radiation treatment known in the art.

Though biodegradability of the thermoplastic dialkanoyl polymer is oftentimes manifest when at least about 10 weight percent of its weight is attributable to dialkanoyl units, especially diadipoyl units, it is desirable that the novel blends, and articles therefrom, comprise thermoplastic dialkanoyl polymer in which at least about 20 weight percent of the weight of such polymer is in the form of dialkanoyl units. In specific aspects of the invention, it is preferred that such polymer contain at least about 50 weight percent, and preferably still at least about 80 weight percent, and upwards to about 100 weight percent of dialkanoyl units therein.

The proportions of the thermoplastic dialkanoyl polymer and other components, e.g., naturally occurring biodegradable product, plastic additive, filler, etc., in the novel blends can vary over a wide range. The optimum composition of the blend will depend, to a significant extent, upon a consideration of factors such as the end-use contemplated; the characteristics or properties desired in the article of manufacture made from the blend, e.g., mechanical strength properties, rate and degree of biodegradability, etc.; the thermoplastic dialkanoyl polymer of choice; the choice of the naturally occurring biodegradable product of choice, plastic additive, and/or filler; the concentrations of such components; and the like.

Broadly, the novel blends of the invention comprise from about 5 to about 95 weight percent of thermoplastic dialkanoyl polymer and from about 95 to about 5 weight percent of the other component(s), based on the total weight of the blend. In various desirable embodiments which take into consideration various factors as illustrated above, the novel blends comprise from about 10 to 90 weight percent, preferably from about 20 to about 80 weight percent, of thermoplastic dialkanoyl polymer; and from about 10 to about 90 weight percent, preferably from about 20 to about 80 weight percent, of the other component, e.g., naturally occurring biodegradable product; based on the total weight of the blend. The novel blend can be comprised of two or more ingredients. For example, the novel blend can comprise one or more thermoplastic dialkanoyl polymers, naturally occurring biodegradable products, plastic additives, and/or fillers.

Suitable equipment for fluxing the novel blend comprising thermoplastic dialkanoyl polymer include Banbury mixers, screw extruders, two-roll or multi-roll mills, ribbon or paddle blendors, calenders, and the like. The time of blending or fluxing is not narrowly critical. The blending time should be sufficient to obtain a substantially uniform mixture.

In various aspects of the invention the novel blends are useful in the preparation of novel biodegradable articles of manufacture such as mulch film, disposable containers, shipping containers, storage containers, packaging material, transplanter containers, and the like. Well-known techniques in the art can be used to fabricate these novel articles and they include, for instance, compression molding, injection molding, transfer molding, extrusion, vaccum forming, blow molding, calendering, rotational molding, coating, dipping, and the like.

Novel articles of manufacture, e.g., mulch film and transplanter containers, which have "tailor-made" or "built-in" properties or characteristics can be fabricated from the novel blends. Thermoplastic dialkanoyl polymerrs as exemplified by poly(1,6-hexamethylene adipate) are capable of accepting high loadings of material in particulate form (fillers such as carbon black, talc, etc.; plastic additives such as polyethylene, polystyrene, etc; naturally occurring biodegradable products such as wood flour, finely ground grain, etc.) thus increasing the stiffness or modulus of articles fabricated from such "filled" polymers. Moreover, the cost of such articles has been reduced markedly. The addition of rubbery material such as natural rubber to the thermoplastic dialkanoyl polymer can increase the impact strength and/or elongation characteristics of articles fabricated therefrom. Transplanter containers and mulch film fabricated from mixtures comprising biodegradable thermoplastic dialkanoyl polymer and water-soluble polymers, e.g. wax-like and solid water-soluble ethylene oxide homopolymers and copolymers, have the ability to undergo relatively slow dissolution or leaching in an aqueous or humid surrounding to thus provide a more favorable environment for growth of fungi. Additional ingredients which can be included in the novel blends are plant nutrients, fertilizer, insecticides, pesticides, herbicides, and the like. One can also use plasticizers, dyes, etc., in the novel blends to further modify the characteristics of the novel articles therefrom.

In the practice of various embodiments of the invention it is desirable that the novel articles of manufacture possess properties and characteristics which are suitable for the application contemplated. For instance, if the novel articles are to be used in mechanical transplantation methods or as shipping containers, e.g., boxes, crates, etc., it is highly desirable that such articles have sufficient strength properties to withstand breakdown or failure during use. By way of illustration, one can use, if desired, containers which are characterized by a modulus range of from about 10,000 psi, and lower, to about 1,000,000 psi (as determined by ASTM Method D-638). On the other hand, containers characterized by a much lower modulus can be tolerated in hand planting techniques, e.g., at least about 300 psi. It is to be understood that the aforementioned values are merely illustrative and that higher and lower values are contemplated as being within the scope of the invention.

One aspect of the invention is directed to novel transplanter containers, fabricated from the novel blends, and optionally, a germination medium in said containers with/without a seed or seedling in such medium. The container can be of any size and shape capable of having utility in horticultural, silvicultural, and agricultural applications. It can be in the form of a flower pot, cone, bullet, tube, cylinder, tray, etc. It should be capable of holding the germination medium therein. In this connection additional support or reinforcement material can be used. For instance, a container shaped in the form of a hollowed tube, opened at both extremities, may not be suitable in holding the germination medium in its interior. This drawbaack can be overcomed by stoppering one end of such tube with suitable plugging means, if necessary. The germination medium can be any mixture suitable for growing plant life such as farm products, flowers, shrubs, trees, grass, etc. The germination medium can be formed from synthetic materials, substances found in nature, or mixtures of both. A desirable germination medium comprises soil formed from disintegrated and decomposed rocks and minerals generally mixed with organic matter in various stages of decay, and having substantial porosity or pore space. The pore space will vary with the texture of the soil. The soil may comprise silt, sand, clay, stone, gravel, minerals, organic matter, etc. Conditioners and stabilizers can be added to or contained in coil and they include, for example, gypsum, calcium chloride, limestone, vermiculite, iron sulfate, water-soluble high molecular weight polymeric electrolytes, and others. Nutrients can be added to the soil to aid plant growth and to supplement the plant-food content thereof. The more important ones include the compounds of nitrogen, phosphorous, and potassium. Trace elements such as magnesium, iron, zinc, copper, etc., have been shown to be beneficial to plant growth and can be added to the soil. Various types of fertilizers provide useful nutrients. They can range from inorganic compounds as illustrated by ammonium nitrate types to organic compounds such as the long lasting urea forms which release the nitrogen slowly.

Any type of seed or seedling capable of growing in soil in contemplated. Of special interest are tree seeds and seedlings as illustrated by the deciduous and coniferous types such as oak, ash, maple, elm, Douglas Fir, pine, spruce, cedar, etc., shrub seedlings as illustrated by ornamental or evergreen types such as taxus, holly, juniper, etc.; plants and flowers of the various well-known varieties; and the like.

By the terms "biodegradable" and "biodegradability," as used herein, are meant that the novel blends and articles therefrom are capable of being consumed by microorganisms as, for example, bacteria or fungi, in an environment suitable to the growth of microorganisms such that there results a weight loss of at least approximately 20 weight percent in the biodegradable thermoplastic dialkanoyl polymer component in such blend or article within a period of about four years, and generally within about two years. The degree and rate of biodegradability depend, to an extent, on the weight percent content of the unit,

contained in the thermoplastic dialkanoyl polymer used in the fabrication of the container, the nature of the other component(s), e.g., plastic additive, naturally occurring biodegradable additive, filler, plasticizer, etc. By way of illustration, transplanter containers which are fabricated from poly(1,6-hexamethylene adipate), $I_r$ of about 0.6, and peat moss, and which are subjected to soil burial tests, evidence weight losses upwards to about 50 weight percent, and higher, within a one year period due to container disintegration and container consumption by microorganisms.

In the illustrative Examples hereinafter disclosed, numerical references in the copolymer or blend designate parts by weight. For example, 67 ethylene/33 vinyl acetate refers to a copolymer containing 67 parts by weight of ethylene and 33 parts by weight of vinyl acetate chemically combined therein.

EXAMPLES 1-24

In Examples 1-24 infra, samples of commercially available high molecular weight polymers were pressed or molded into plaques from which test specimens were cut. These specimens were tested for degradation by fungi using ASTM - D-1924-63[1]. This procedure requires the placement of test specimens in or on a solid agar growth medium that is deficient only in carbon. The medium and specimens are inoculated with the test microorganisms and incubated for 3 weeks. Any growth which may occur is dependent on the utilization of a component of the specimen as a carbon source by the test organism. The test fungi consisted of a mixture of Aspergillus niger, Aspergillus flavus, Chaetomium globosum, and Penicillium funiculosum. Since possible complication that growth may occur as a result of the presence of additives in the polymeric specimen, it was necessary that the polymeric specimen tested be free from stabilizers, plasticizers, lubricants, and other extraneous organic substances, or that the presence of such additives be recognized. If a pure polymeric specimen showed heavy growth and concurrent loss of weight and mechanical properties this was considered good evidence of its biodegradability.

(1) ASTM-D-1924: Recommended practice for determining resistance of synthetic polymeric materials to fungi. Ann. Book of ASTM Standards, 1970, Part 24, page 593.

After various exposure times up to three weeks, and longer, the samples were examined and assigned growth ratings as shown below:

Growth Ratings:
0 = No Growth
1 = Traces (Less than 10 percent Covered)
2 = Light Growth (10 to 30 percent Covered)
3 = Medium Growth (30 to 60 percent Covered)
4 = Heavy Growth (60 to 100 percent Covered)

The pertinent data are set out in Table I below.

TABLE I

| Sample No. | Commercial Thermoplastic | Growth Rating |
|---|---|---|
| 1 | Acrylonitrile/Butadiene/Styrene Terpolymer (ABS) [a] | 0 |
| 2 | Blend of ABS and Poly(Bisphenol A Carbonate) [b] | 0 |
| 3 | Butadiene/Acrylonitrile Rubber [c] | 0 |
| 4 | 72/Styrene/28 Acrylonitrile Copolymer | 0 |
| 5 | Poly(Methyl Methacrylate) [d] | 0 |
| 6 | Poly(Ethylene Terephthalate) [e] | 0 |
| 7 | Poly(Cyclohexanedimethanol Terephthalate) [f] | 0 |
| 8 | Poly(Bisphenol A Carbonate) [g] | 0 |
| 9 | Poly(4-Methyl-1-Pentene) | 0 |
| 10 | Polyisobutylene [h] | 0 |
| 11 | Chlorosulfonated Polyethylene [i] | 0 |

TABLE I-continued

| Sample No. | Commercial Thermoplastic | Growth Rating |
|---|---|---|
| 12 | Cellulose Acetate [j] | 0 |
| 13 | Cellulose Butyrate [k] | 0 |
| 14 | Nylon-6; Nylon-6/6; Nylon-12 | 0 |
| 15 | Poly(Vinyl Butyral) | 0 |
| 16 | Polyformaldehyde [l] | 0 |
| 17 | Poly(Vinyl Ethyl Ether); $I_r$=4 | 0 |
| 18 | Poly(Vinyl Acetate); $I_r$=0.8 | 1 |
| 19 | Poly(Vinyl Acetate), 50% Hydrolyzed to Poly(Vinyl Alcohol) | 1 |
| 20 | High Density Polyethylene, 31,600 M.W. | 0 |
| 21 | High Density Polyethylene, 52,500 M.W. | 0 |
| 22 | High Density Polyethylene, 97,300 M.W. | 1 |
| 23 | Low Density Polyethylene, 21,000 M.W. | 1 |
| 24 | Low Density Polyethylene, 28,000 M.W. | 0 |

[a] Kralastic K2938 by Uniroyal, Inc.
[b] Cycoloy by Borg Warner Corp.
[c] Hycar 1002 by B. F. Goodrich Co.
[d] Lucite by E. I. duPont de Nemours & Co.
[e] Arnite by Polychem AKU-GE, Holland
[f] Kodel by Eastman Kodak Co.
[g] Lexan 101 by General Electric Co.
[h] Vistanex by I. G. Farben
[i] Hypalon (29% Cl) by E.I. duPont de Nemours & Co.
[j] Tenite (036A3719748) by Eastman Kodak Co.
[k] Tenite (233A22300H2) by Eastman Kodak Co.
[l] Celcon by Celanese Corp.

EXAMPLES 25–28

Various high molecular weight thermoplastic ethylene copolymers were tested for biodegradability in the manner set out in Examples 1–24 supra. The pertinent data are noted in Table II below.

TABLE II

| Sample No. | Ethylene Copolymer | Growth Rating |
|---|---|---|
| 25 | 67 Ethylene/33 Vinyl Acetate | 1 |
| 26 | 55 Ethylene/45 Vinyl Acetate | 1 |
| 27 | 85 Ethylene/15 Acrylic Acid | 0 |
| 28 | 82 Ethylene/18 Ethyl Acrylate | 0 |

EXAMPLES 29–38

Several relatively low molecular weight thermoplastic copolymers of ethylene and different vegetable oils were tested for biodegradability in the manner set out in Examples 1–24 supra. These copolymers were carefully purified before testing to remove unreacted vegetable oil. The pertinent data are noted in Table III below.

TABLE III

| Sample No. | Ethylene/Vegetable Oil Copolymer | Growth Rating |
|---|---|---|
| 29 | 74 Ethylene/26 Castor Oil | 0 |
| 30 | 72 Ethylene/28 Linseed Oil | 0 |
| 31 | 73 Ethylene/27 Safflower Oil | 0 |
| 32 | 73 Ethylene/27 Soybean Oil | 0 |
| 33 | 59 Ethylene/41 Neat Foot Oil | 0 |
| 34 | 80 Ethylene/20 Peanut Oil | 0 |
| 35 | 81 Ethylene/19 Rapeseed Oil | 0 |
| 36 | 84 Ethylene/16 Olive Oil | 0 |
| 37 | 82 Ethylene/18 Corn Oil | 0 |
| 38 | 91 Ethylene/9 Oleic Acid | 0 |

EXAMPLES 39–47

Since high molecular weight thermoplastic polystyrene evidenced a Growth Rating of zero, various high molecular weight thermoplastic copolymers of styrene were prepared and tested in the manner indicated in Examples 1–24 supra. As seen in Table IV below, thermoplastic copolymers of styrene and one or more comonomers such as acrylic acid, sodium acrylate, ethyl acrylate, dibutyl maleate, and dimethyl itaconate, were resistant to attack by the microorganisms. The pertinent data are noted in Table IV infra.

TABLE IV

| Sample No. | Copolymer | Reduced Viscosity | Growth Rating |
|---|---|---|---|
| 39 | 84 Styrene/16 Acrylic Acid | 0.9[a] | 0 |
| 40 | 84 Styrene/16 Sodium Acrylate | — | 0 |
| 41 | 85 Styrene/10 Acrylic Acid/ 5 Dibutyl Maleate | 0.5[a] | 0 |
| 42 | 85 Styrene/10 Acrylic Acid/ 5 Dimethyl Itaconate | 0.5[a] | 0 |
| 43 | 70 Styrene/30 Dimethyl Itaconate | 0.3[a] | 0 |
| 44 | 50 Styrene/50 Ethyl Acrylate | 0.6[b] | 0 |
| 45 | 85 Styrene/15 Bis(2-Ethylhexyl) Fumarate | 0.5[c] | 0 |
| 46 | 85 Styrene/15 Dodecyl Acrylate | 0.4[a] | 0 |
| 47 | 85 Styrene/10 Ethyl Acrylate/ 5 Dodecyl Acrylate | 0.4[a] | 0 |

[a] Measured in dimethylformamide, 0.2 g/100 ml at 30°C.
[b] Measured in acetone, 0.2 g/100 ml at 30°C.
[c] Measured in benzene, 0.2 g/100 ml at 30°C.

EXAMPLES 48–54

Various polymers were tested for biodigradability in the manner indicated in Examples 1–24 supra. The results are documented in Table V below.

TABLE V

| Sample No. | Polymer | Reduced Viscosity | Growth Rating |
|---|---|---|---|
| 48 | Poly(Ethylene terephthalate) | high | 0 |
| 49 | Poly(Cyclohexanedimethanol Terephthalate) | high | 0 |
| 50 | Poly(Ethylene Succinate) | 0.2 | 4 |
| 51 | Poly(Tetramethylene Succinate) | 0.6 | 1 |
| 52 | Poly(Tetramethylene Succinate) | 0.1 | 4 |
| 53 | Poly(Hexamethylene Succinate) | 0.9 | 4 |
| 54 | Poly(Ethylene Adipate) | 0.1 | 4 |

EXAMPLE 55

Thermoplastic poly(hexamethylene succinate), reduced viscosity of about 0.9, is chosen for biodegradation testing by the soil burial technique. By injection molding techniques, this polymer is molded into tensile bars measuring approximately 6 inches × 0.5 inch × 0.13 inch. Various tensile bars are buried in a mixture of equal parts of New Jersey garden soil, Michigan peat moss, and builders sand. After 12 months the bars are removed from the soil. Visual examination shows substantial pitting, erosion, and disintegration of the bars.

EXAMPLE 56

Thermoplastic poly(ethylene adipate) reduced viscosity of about 0.5, is chosen for biodegradation testing by the soil burial technique. By injection molding techniques, this polymer is molded into tensile bars measuring approximately 6 inches × 0.5 inch × 0.13 inch. Various tensile bars are buried in a mixture of equal parts of New Jersey garden soil, Michigan peat moss,

13 and builders sand. After 12 months the bars are removed from the soil. Visual examination shows substantial pitting, erosion, and disintegration of the bars.

EXAMPLE 57

Thermoplastic poly(tetramethylene adipate), reduced viscosity of about 0.5, is chosen for biodegradation testing by the soil burial technique. By injection molding techniques, this polymer is molded into tensile bars measuring approximately 6 inches × 0.5 inch × 0.13 inch. Various tensile bars are buried in a mixture of equal parts of New Jersey garden soil, Michigan peat moss, and builders sand. After 12 months the bars are removed from the soil. Visual examination shows substantial pitting, erosion, and disintegration of the bars.

EXAMPLE 58

In lieu of forming tensile bars, the polymers of Examples 55–56 are molded into containers shaped similar to small flower pots or whisky jiggers. The soil burial tests are then repeated. After 12 months the containers are removed. Visual examination shows a high degree of pitting, erosion, and disintegration as well as weight loss in the containers.

EXAMPLES 59–61

Three thermoplastic polyester polyurethanes are molded into containers shaped similar to small flower pots. Each of the polyurethanes are prepared by reacting equimolar amounts of bis(4-isocyanatophenyl) methane and different polyester diols of about 2,000 number average molecular weight. The polyester diols are poly(ethylene adipate) diol, poly(1,4-butylene adipate) diol, and poly(1,6-hexamethylene adipate) diol. The number average molecular weight of each of the resulting polyurethanes is approximately 25,000 to 30,000. These polyurethanes are injection molded into containers designed in the shape of a "bullet" measuring approximately 5 inches in length and one inch in outside diameter at the top. The wall of the bullet is about 1/16 inch in thickness and is weakened by a slit 1/16 inch wide that extends longitudinally from the rim to a hole near the point of the bullet. The hole is about ¼ inch wide and about ½ inch long. The containers are filled with a mixture containing equal parts of garden soil, Michigan peta moss, and builders sand, and seeded with Douglas Fir. Within the confines of a greenhouse, the containers are then inserted into garden soil enriched with plant nutrients and conditioners. The watering schedule is predetermined and takes into consideration the bullet size, climate, and tree species. After a period of 12 months, normal root structure and normal growth of the tree seedlings are observed. Visual examination of the bullets shows substantial pitting and disintegration.

EXAMPLES 62–84

In Examples 62–84 various blends of poly(alkylene alkanoates) along and with other substances are formed by fluxing on a two-roll mill for periods of time ranging from about 10 to 20 minutes at temperatures generally below about 100°C. depending on the softening point of the components comprising the blend. Plaques measuring about 6 inches × 6 inches × 0.04 inch from the blends are then formed via compression molding techniques. Strips measuring approximately 1 inch × 2 inches × 0.04 inch are cut from each plaque. Strips cut from each plaque are buried in a mixture of equal parts of New Jersey garden soil, Michigan peat moss, and builders sand. After 12 months the strips are removed and measured for weight loss. Visual examination of the strips shows substantial pitting and disintegration. Strips from each plaque are also tested for biodegradation by fungi using ASTM Method D-1924-63. The growth rating is 3 or higher. The composition of the blends is set out in Table VI below.

TABLE VI

| Example No. | Composition of Blend |
| --- | --- |
| 62 | 80 PEA[1]/20 Shredded Paper |
| 63 | 80 PEA/20 Hydroxypropylcellulose |
| 64 | 80 PEA/20 Rice Hulls |
| 65 | 80 PEA/20 Peat Moss |
| 66 | 80 PEA/20 Douglas Fir Bark[2] |
| 67 | 75 PEA/25 Urea |
| 68 | 75 PEA/25 Egg Albumin |
| 69 | 75 PHS[3]/25 Rice Hulls |
| 70 | 75 PHS/25 HDPE[4] |
| 71 | 75 PHS/25 Asbestos |
| 72 | 60 PHS/20 LDPE[5]/20 PEO[6] |
| 73 | 70 PHS/30 Polyoxyethylene Diol 20M[7] |
| 74 | 80 PTS[8]/20 Glass Wool |
| 75 | 80 PTS/20 Talc |
| 76 | 75 PTS/25 Carbon Black |
| 77 | 65 PTS/35 Limestone |
| 78 | 50 PTS/25 LDPE/25 PEO |
| 79 | 60 PTS/40 Douglas Fir Bark |
| 80 | 60 PEA/40 Douglas Fir Bark |
| 81 | 50 PEPU[9]/50 Douglas Fir Bark |
| 82 | 70 PEA/30 Thermoplastic Polystyrene |
| 83 | 60 PTS/40 Reclaimed Butadiene/Styrene Rubber |
| 84 | 50 PEA/25 PEO/25 Sawdust |

Footnotes to Table VI:
[1]PEA represents poly(ethylene adipate), $I_R$ of about 0.5, Growth Rating of 4.
[2]Silvacon 412 by Weyerhaeuser Co.
[3]PHS represents poly(1,6-hexamethylene succinate), $I_R$ of about 0.9, Growth Rating of 4.
[4]HDPE represents high density polyethylene
[5]LDPE represents low density polyethylene
[6]PEO represents ethylene oxide homopolymer having a number average molecular weight of about 4,000,000.
[7]Polyoxyethylene diol of approximately 20,000 number average molecular weight.
[8]PTS represents poly(1,4-tetramethylene succinate), $I_R$ of about 0.6, Growth Rating of 4.
[9]PEPU represents thermoplastic polyester polyurethane of about 20,000 number average molecular weight prepared by reacting equimolar amounts of poly(1,4-butylene adipate) diol (mol. wt.~2,000) and bis(4-isocyanatophenyl)methane.

EXAMPLE 85

Thermoplastic poly(ethylene adipate), $I_R$ of about 0.6, as well as the blends set out in Examples 62–84 are molded into containers designed in the shape of a "bullet" measuring approximately 5 inches in length and one inch in outside diameter at the top. The wall of the bullet is about 1/16 inch in thickness and has a hole near the point of the bullet. The containers are filled with a mixture containing equal parts of garden soil, Michigan peat moss, and builders sand, and seeded with Douglas Fir. Within the confines of a greenhouse, the containers are then inserted into garden soil enriched with plant nutrients and conditioners. The watering schedule is predetermined and takes into consideration the bullet size, climate, and tree species. After a period of 12 months, normal root structure and normal growth of the tree seedlings are observed. Visual examination of the bullets shows substantial pitting and/or disintegration.

We claim:

1. A blend comprising (i) from about 5 to about 95 weight percent of biodegradable thermoplastic dialkanoyl polymer, said polymer having a reduced viscosity value of at least about 0.1 and upwards to about 10 and being further characterized in that at least about 10 weight percent of said thermoplastic dialkanoyl polymer is attributable to recurring units of the formula

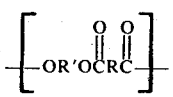

wherein R represents a divalent aliphatic hydrocarbon radical, and wherein R' is of the group consisting of divalent aliphatic hydrocarbon radicals and divalent aliphatic oxa-hydrocarbon radicals, (ii) from about 95 to about 5 weight percent of substances of the group consisting of plastic additives, fillers, and mixtures thereof, and (iii) from 0 to about 90 weight percent of a naturally occurring biodegradable product; based on the total weight of said blend.

2. The blend of claim 1 wherein R is of the group consisting of $C_1$-$C_{12}$ alkylene, and wherein R' is of the group consisting of $C_1$-$C_{12}$ alkylene, and -$C_2$-$C_{12}$ alkylene (oxy $C_2$-$C_{12}$ alkylene)$_x$, the variable x being an integer of at least one.

3. The blend of claim 1 wherein said biodegradable thermoplastic dialkanoyl polymer has a reduced viscosity value of at least about 0.2 to about 5 and is further characterized in that at least about 20 weight percent of said polymer is attributable to the recurring dialkanoyl unit shown therein.

4. The blend of claim 1 wherein at least about 50 weight percent of said polymer is attributable to recurring dialkanoyl units.

5. The blend of claim 4 wherein at least about 80 to about 100 weight percent of said polymer is attributable to recurring dialkanoyl units.

6. The blend of claim 1 comprising (i) from about 5 to less than 95 weight percent of biodegradable thermoplastic dialkanoyl polymer, (ii) from more than 0 to less than 90 weight percent of naturally occurring biodegradable product, and (iii) from more than 5 to less than 90 weight percent of ingredients of the group consisting of plastic additives, fillers and mixtures thereof, based on the total weight of said blend.

7. The blend of claim 6 comprising (i) from about 20 to about 80 weight percent of biodegradable thermoplastic dialkanoyl polymer, (ii) from more than 0 to about 60 weight percent of naturally occurring biodegradable product, and (iii) from more than 5 to about 80 weight percent of ingredients of the group consisting of plastic additives, fillers, and mixtures thereof, based on the total weight of said blend.

8. The blend of claim 7 wherein said naturally occurring biodegradable product is tree bark.

9. Articles of manufacture from the blend claimed in claim 1.

10. Articles of manufacture from the blend claimed in claim 2.

11. Articles of manufacture from the blend claimed in claim 4.

12. Articles of manufacture from the blend claimed in claim 5.

13. Articles of manufacture from the blend claimed in claim 6.

14. The articles of manufacture of claim 11 in the form of a container.

15. The articles of manufacture of claim 11 in the form of a film.

16. The articles of manufacture of claim 11 in the form of packaging material.

17. The articles of manufacture of claim 9 in the form of a transplanter container which has a medium to germinate and grow seeds or seedlings therein.

18. The container of claim 14 in which there is a medium to germinate and grow seeds or seedlings therein.

19. The article of manufacture of claim 17 wherein said germination medium contains a seed or seedlings therein.

20. The article of manufacture of claim 18 wherein said germination medium contains a seed or seedling therein.

21. A blend as in claim 6 in which said naturally occurring biodegradable product is soyabean meal.

22. A blend as in claim 7 in which said naturally occurring biodegradable product is soyabean meal.

23. Articles of manufacture as in claim 13 in which said naturally occurring biodegradable product is soyabean meal.

24. The articles of manufacture of claim 13 in the form of a container.

25. The articles of manufacture of claim 13 of the form of a film.

26. The articles of manufacture of claim 13 in the form of packaging material.

27. The article of manufacture of claim 9 in the form of a transplanter container which has a medium to germinate and grow seeds or seedlings therein.

28. The container of claim 24 in which there is a medium to germinate and grow seeds or seedlings therein.

29. The article of manufacture of claim 27 wherein said germination medium contains a seed or seedlings therein.

30. The article of manufacture of claim 28 wherein said germination medium contains a seed or seedling therein.

* * * * *